US012208495B1

(12) United States Patent
Heim

(10) Patent No.: US 12,208,495 B1
(45) Date of Patent: Jan. 28, 2025

(54) TOOLING FOR REMOVING BIT HOLDERS FROM BASE BLOCKS OF MILLING DRUMS

(71) Applicant: Caterpillar Paving Products Inc., Brooklyn Park, MN (US)

(72) Inventor: Daniel Jonathan Heim, Blaine, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 18/349,259

(22) Filed: Jul. 10, 2023

(51) Int. Cl.
*B23P 11/00* (2006.01)
*B25B 27/02* (2006.01)

(52) U.S. Cl.
CPC .......... *B25B 27/02* (2013.01); *E01C 2301/00* (2013.01)

(58) Field of Classification Search
CPC ....... B25B 27/02; B25B 17/14; B25B 27/023; B25B 27/026; B25B 27/064; E01C 2301/00; B23P 11/00; B23P 19/025; E21C 35/19; E21C 35/18; E21C 35/188; E21C 35/197; E02F 9/2866; E02F 9/2891
See application file for complete search history.

(56) References Cited

U.S. PATENT DOCUMENTS

| | | | | |
|---|---|---|---|---|
| 6,059,373 A * | 5/2000 | Wright | E21C 35/18 | 299/110 |
| 7,891,084 B1 * | 2/2011 | Sollami | E02F 9/2866 | 29/760 |
| 8,622,483 B2 | 1/2014 | Sollami | | |
| 10,246,999 B2 | 4/2019 | Persano | | |
| 10,415,386 B1 * | 9/2019 | Sollami | B25D 1/16 | |
| 2007/0045599 A1 * | 3/2007 | Bilyeu | B66F 15/00 | 254/25 |
| 2009/0142151 A1 * | 6/2009 | Sollami | E02F 9/2858 | 408/239 R |
| 2010/0048370 A1 * | 2/2010 | Sollami | B23B 31/003 | 483/65 |

FOREIGN PATENT DOCUMENTS

DE 102016103452 B3 12/2016

* cited by examiner

*Primary Examiner* — Jun S Yoo

(57) ABSTRACT

A tooling for removing a bit holder from a base block of a milling drum. The tooling includes a bracket, a pry tool, and an actuation member. The bracket is configured to be engaged with the bit holder and defines an impact surface to receive one or more impacts. The pry tool has a portion configured to be positioned between the bit holder and the base block. The actuation member is movably engaged with the bracket and is actuatable to contact and exert a pushing action on the pry tool to move and advance the portion of the pry tool into an interface defined between the bit holder and the base block. When the impact surface receives the impacts, impact components are correspondingly transferred to the pry tool to supplement the pushing action for a removal of the bit holder from the base block.

10 Claims, 9 Drawing Sheets

TOOLING FOR REMOVING BIT HOLDERS FROM BASE BLOCKS OF MILLING DRUMS

TECHNICAL FIELD

The present disclosure relates generally to bit holders in milling drums. More particularly, the present disclosure relates to a tooling and a method for removing a bit holder from a base block of a milling drum.

BACKGROUND

Work machines such as cold planers, road reclaimers, etc., generally utilize a milling assembly having a milling drum to mill and/or process (e.g., scarifying, removing, reclaiming, etc.) a ground surface (e.g., a roadway, parking lots, etc.). It is common for the milling drum to include a drum portion and multiple cutting bit assemblies positioned around the drum portion. A cutting bit assembly may include a cutting bit and a bit holder. The bit holder may be mounted and/or pressed into to a base block of the milling drum while the cutting bit may be in turn engaged with the bit holder. The base block may be securely attached to the drum portion, for example, by welding.

Conditions, such as cutting bit wear-outs, cutting bit failures, the need to attain a certain type of a finished milling surface, and the like, may require the cutting bits and/or the cutting bit assemblies to be removed from the drum portion and/or be replaced with new cutting bits or cutting bit assemblies. In this regard, a removal of bit holders from the corresponding base blocks of the milling drum is generally cumbersome and often requires large sledgehammers and prying wedges to be used to separate the bit holders from the corresponding base blocks. Factors such as forces generated during a milling operation may also force the bit holders tightly into the base blocks of the milling drum, often making a removal of the bit holders difficult, time consuming, and labor intensive.

SUMMARY OF THE INVENTION

In one aspect, the disclosure relates to a tooling for removing a bit holder from a base block of a milling drum. The tooling includes a bracket, a pry tool, and an actuation member. The bracket is configured to be engaged with the bit holder and defines an impact surface to receive one or more impacts. The pry tool has a portion configured to be positioned between the bit holder and the base block. The actuation member is movably engaged with the bracket and is actuatable to contact and exert a pushing action on the pry tool to move and advance the portion of the pry tool into an interface defined between the bit holder and the base block. When the impact surface receives the impacts, impact components are correspondingly transferred to the pry tool to supplement the pushing action for a removal of the bit holder from the base block.

In another aspect, the disclosure is directed to a method for removing a bit holder from a base block of a milling drum. The method includes engaging a bracket with the bit holder. The bracket defines an impact surface. Further, the method includes positioning a portion of a pry tool between the bit holder and the base block. The method also includes actuating an actuation member movably engaged with the bracket to contact and exert a pushing action on the pry tool to move and advance the portion of the pry tool into an interface defined between the bit holder and the base block. Additionally, the method includes providing one or more impacts on the impact surface such that when the impact surface receives the impacts, impact components are correspondingly transferred to the pry tool to supplement the pushing action for a removal of the bit holder from the base block.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
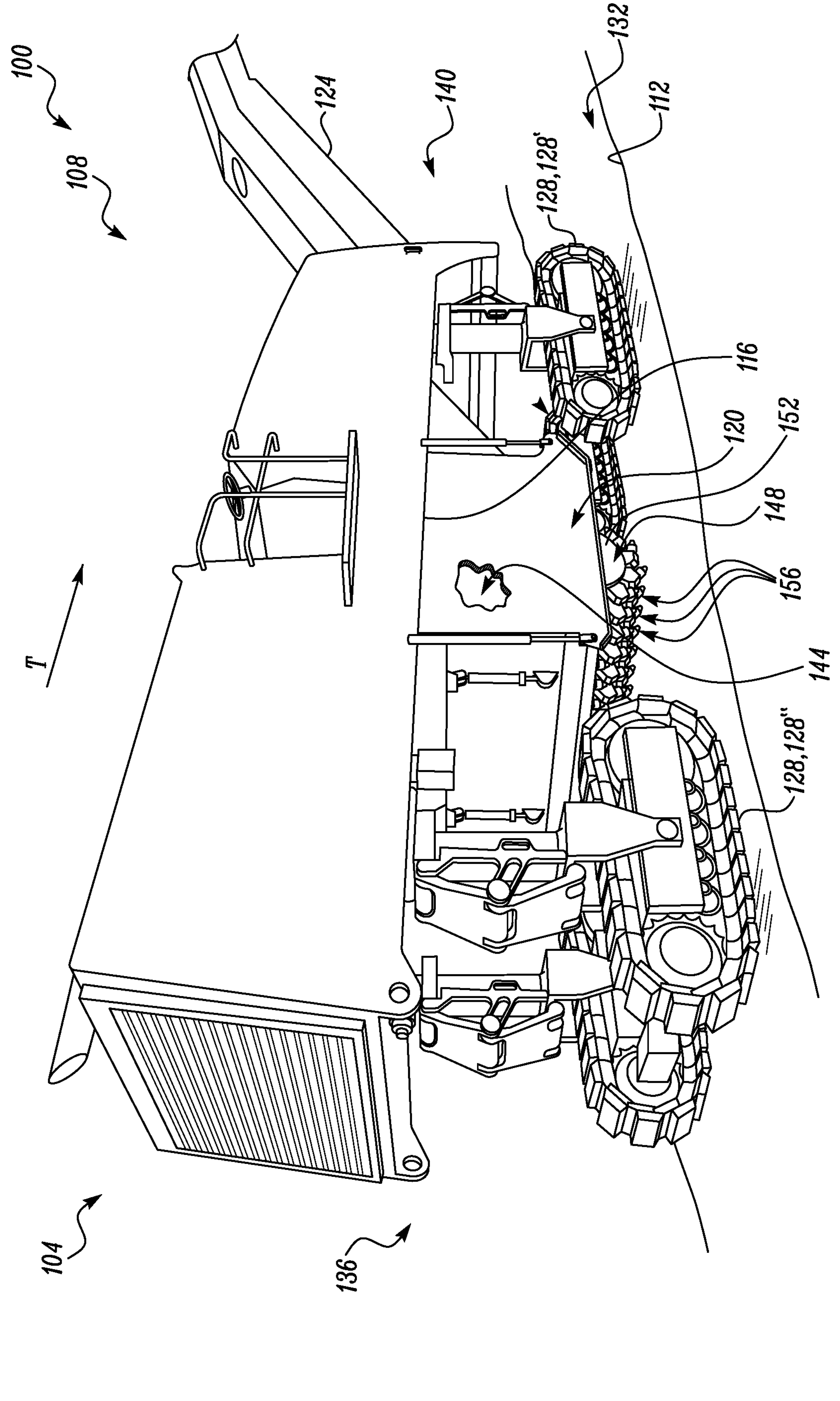
FIG. 1 is a perspective view of an exemplary mobile work machine having a milling assembly, in accordance with one or more aspects of the present disclosure.

Referring to FIG. 1, an exemplary mobile work machine (referred to as a machine 100) is described. The machine 100 may include a milling machine 104—such as a roadway/pavement profiler, a roadway planer, a road reclaimer, and/or the like. As an example, the machine 100 may correspond to a cold planer 108. The machine 100 may be used to perform a milling operation to modify a ground surface 112, e.g., a roadway surface. The milling operation may include one or more of scarifying, removing, mixing, and/or reclaiming material, from the ground surface 112. Although not limited, the ground surface 112 may include a worn out surface of a roadway formed from one or more of asphalt, bitumen, concrete, and/or other road surface materials, and the milling operation may be performed to mill and/or remove one or more layers of the ground surface 112 as the machine 100 moves along a direction, T, for the laying by other machines of one or more new layers of a new ground surface on the roadway.

The machine 100 may include a frame 116, a milling assembly 120, a conveyor 124, and a set of traction devices 128 to support and propel the machine 100 over an expanse of the roadway (e.g., along direction, T, see exemplary annotation '132' used for the roadway). The traction devices 128 may include tracks, or wheels, or a combination thereof. Exemplarily, the machine 100 may include four traction devices, with two traction devices located at a front end 140 of the machine 100—as forward traction devices 128' and two traction devices located at a rear end 136 of the machine 100—as rearward traction devices 128'. Lesser or higher number of the forward traction devices 128' and/or the rearward traction devices 128' may be contemplated. The traction devices 128 may be adjustably supported with respect to the frame 116. In other words, the traction devices 128 may be each moved or varied independently with respect to the frame 116, such that a distance (e.g., a height) of the frame 116 may be correspondingly varied relative to the traction devices 128 and thus the ground surface 112. In that manner, the frame 116 may acquire a desired orientation and/or a gradient with respect to the ground surface 112.

The terms 'front', 'forward' and 'rear', rearward, and the like terms, as may be used in the present disclosure, may be applied in relation to the exemplary direction of travel of the machine 100, as represented by the arrow, T, with said direction of travel, T, being exemplarily defined from the rear end 136 of the machine 100 towards the front end 140 of the machine 100.

Figure 2:
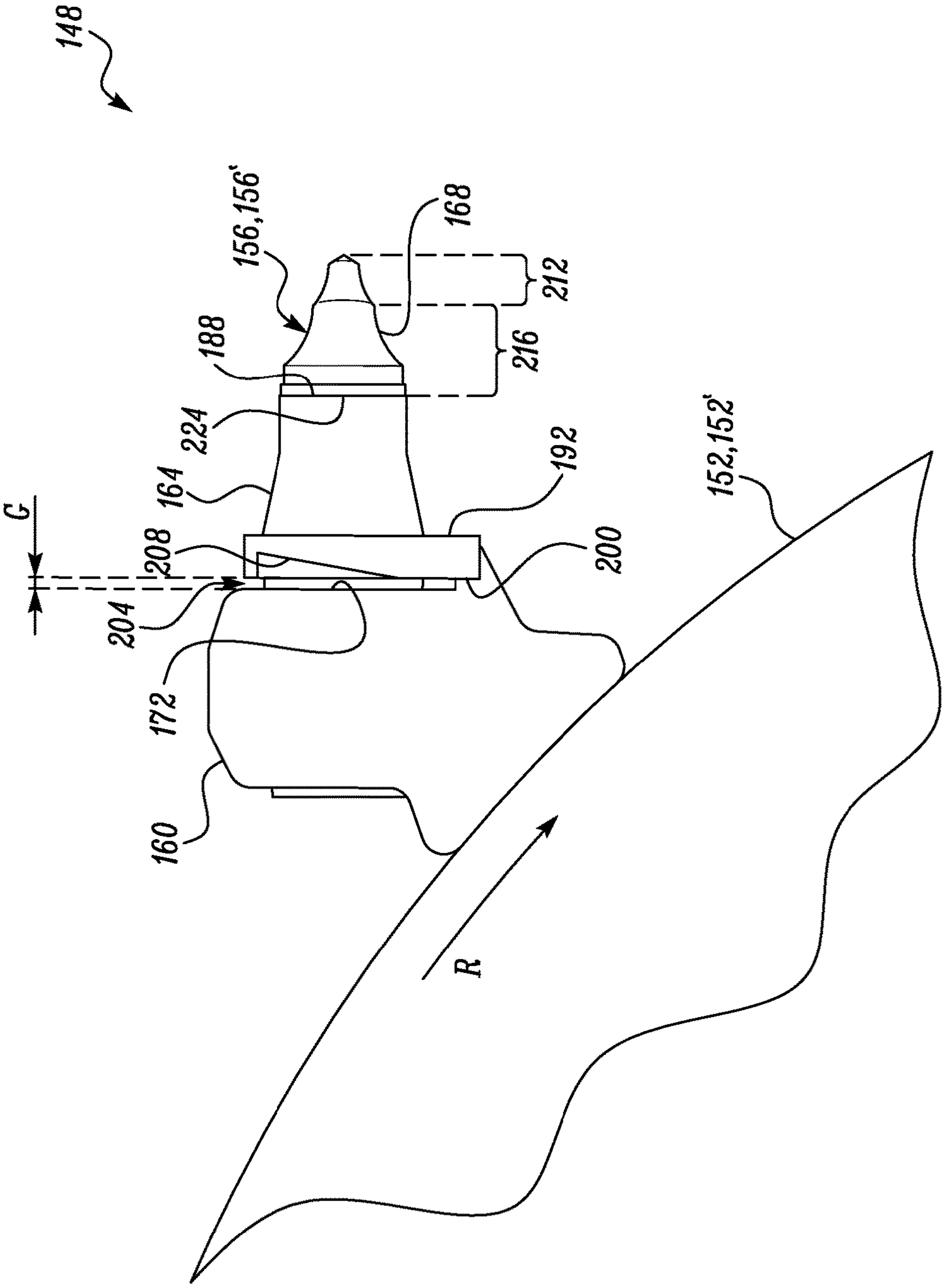
FIG. 2 is a close-up view of a portion of a milling drum of the milling assembly illustrating an exemplary cutting bit assembly of the milling drum, in accordance with one or more aspects of the present disclosure.

Referring to FIGS. 1 and 2, the milling assembly 120 may be supported on and/or be suspended under the frame 116 of the machine 100. Exemplarily, the milling assembly 120 may be positioned in between the forward traction devices 128' and the rearward traction devices 128' of the machine 100 in order to occupy and define a generally mid-region of the machine 100. The milling assembly 120 may define an enclosure 144. Further, the milling assembly 120 may include a milling drum 148 that may be housed within the enclosure 144. The milling drum 148 may include a drum portion 152, and, although not limited, the drum portion 152 may include a cylindrically shaped drum portion 152'.

The milling assembly 120 may also include one or more cutting bit assemblies 156 (for example, only a few cutting bit assemblies 156 are marked in FIG. 1). The cutting bit assemblies 156 may be positioned over and around the drum portion 152, and, exemplarily, a layout of the cutting bit assemblies 156 around the drum portion 152 may be according to an array or a pattern. During the milling operation, the drum portion 152 (and thus the cutting bit assemblies 156 or the milling drum 148 as a whole) may be powered by a driveshaft (not shown) to rotate, e.g., about an operational axis (not shown) (see exemplary rotary direction, R, in FIGS. 2 and 4 through 8) in order to perform the milling operation on the ground surface 112.

In further detail, during the milling operation, the frame 116 may be moved with respect to the forward traction devices 128' and/or the rearward traction devices 128' and thus with respect to the ground surface 112, such that the milling drum 148 may be lowered and extended to contact and engage with the ground surface 112. As the milling drum 148 may be powered to rotate (e.g., mechanically or hydraulically) and be made to contact the ground surface 112, the cutting bit assemblies 156 of the milling drum 148 may engage with the ground surface 112 to rip and break apart one or more layers (e.g., top layers) of the ground surface 112. In that manner, the milling operation over the ground surface 112 may be performed. During the milling operation, said layers of the ground surface 112 may break into rubble, dust, and debris, and may result in the formation of milled materials.

In effect, the milling operation may facilitate a disintegration of one or more layers of the ground surface 112 to result in milled materials and thus a milled surface underneath the machine 100. Said milled materials may be confined within the enclosure 144 and may be transferred to the conveyor 124 so as to clear the milled materials from the enclosure 144. The conveyor 124 may in turn convey the milled materials into a dump body of a transport vehicle (e.g., a dump truck) (not shown) that may move ahead of the machine 100 during the milling operation. In that manner, as the machine 100 may move over the ground surface 112 (e.g., along the exemplary direction, T), the milling operation may be performed over and across an expanse of the roadway 132.

Referring to FIG. 2, and also in conjunction with FIGS. 4 to 8, an exemplary cutting bit assembly 156' is illustrated and described. Aspects described for the cutting bit assembly 156' may be applicable to all cutting bit assemblies 156 which are positioned around the drum portion 152 of the milling drum 148. The cutting bit assembly 156' may include a base block 160, a bit holder 164, and a cutting bit 168.

The base block 160 may include a rigid structure connected to the drum portion 152 and may be configured to couple and secure an assembly of the bit holder 164 and the cutting bit 168 onto the drum portion 152. The base block 160 may be formed integrally with the drum portion 152, although it is possible for the base block 160 to be separably formed from the drum portion 152 and thus may be coupled (e.g., fixedly coupled) to the drum portion 152 by one or more fastening techniques, such as welding and/or mechanical fastening, and/or by application of other fastening techniques now known or in the future developed.

The base block 160 may be composed of metal or any other appropriate high-strength and rigid material or combination of materials. For example, the base block 160 may be composed of hardened steel or tungsten carbide. In the case where the base block 160 is integral to the drum portion 152, the base block 160 may be made from the same material as the drum portion 152. Further, the base block 160 may define a base block surface 172 and a bore 176 (see bore 176 in a transparent region 180 of the base block 160 in FIG. 8) extending from the base block surface 172 inwards into a body of the base block 160.

The bit holder 164 may include a sleeve-like structure and may be configured to hold the cutting bit 168 with the base block 160. As an example, the bit holder 164 may facilitate the cutting bit 168 to be oriented outwardly and away from the drum portion 152, thus allowing the cutting bit 168 to contact and cut into one or more layers of the ground surface 112 as the drum portion 152 (and thus the milling drum 148) may rotate during the milling operation. In one example, the bit holder 164 may include a substantially cylindrical or rectangular shape, although it is possible for the bit holder 164 to include various other appropriate shapes. The bit holder 164 may be composed of any appropriate material, such as, but is not limited to, hardened steel, tungsten carbide, or any combination thereof. Although not limited, the bit holder 164 may include a general shape of a truncated cone.

Figure 4:
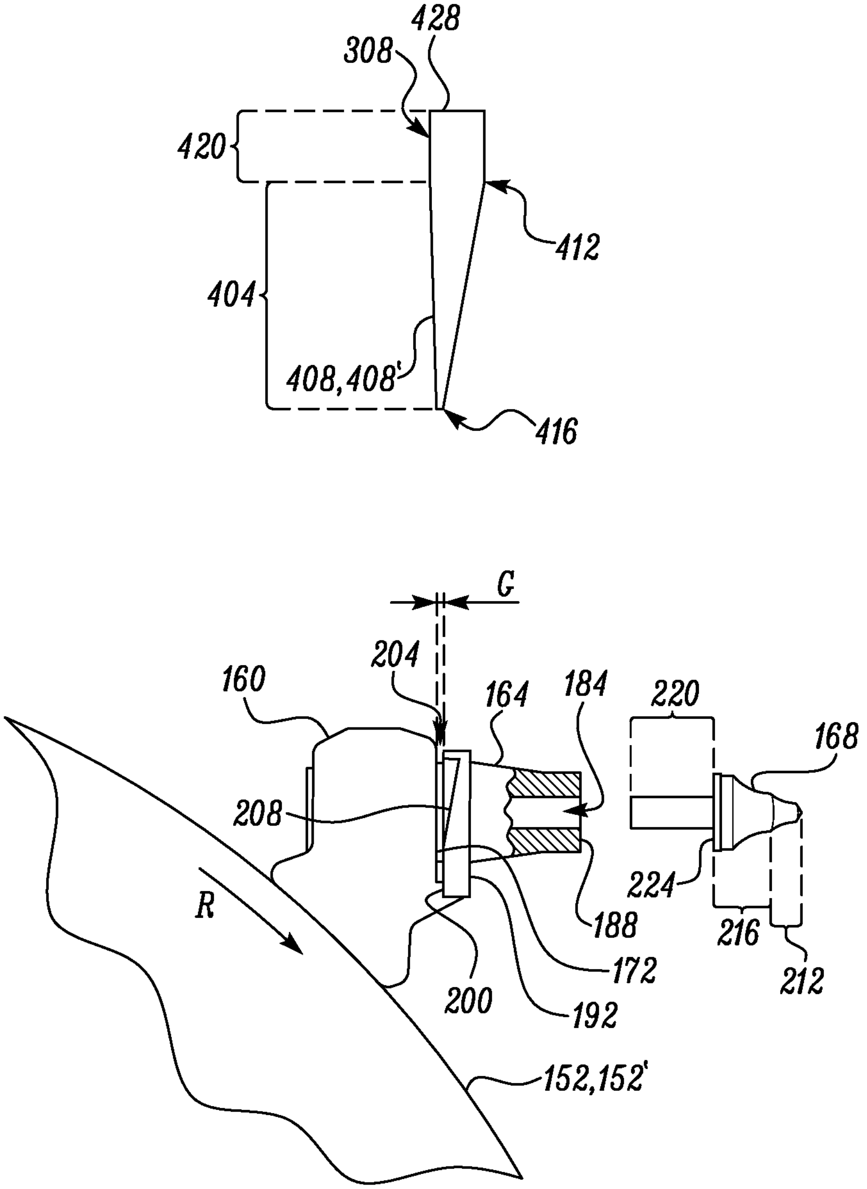
FIGS. 4 to 8 are side views illustrating an exemplary process or method for removing the bit holder from the base block of the milling drum, in accordance with one or more aspects of the present disclosure.
Figure 5:
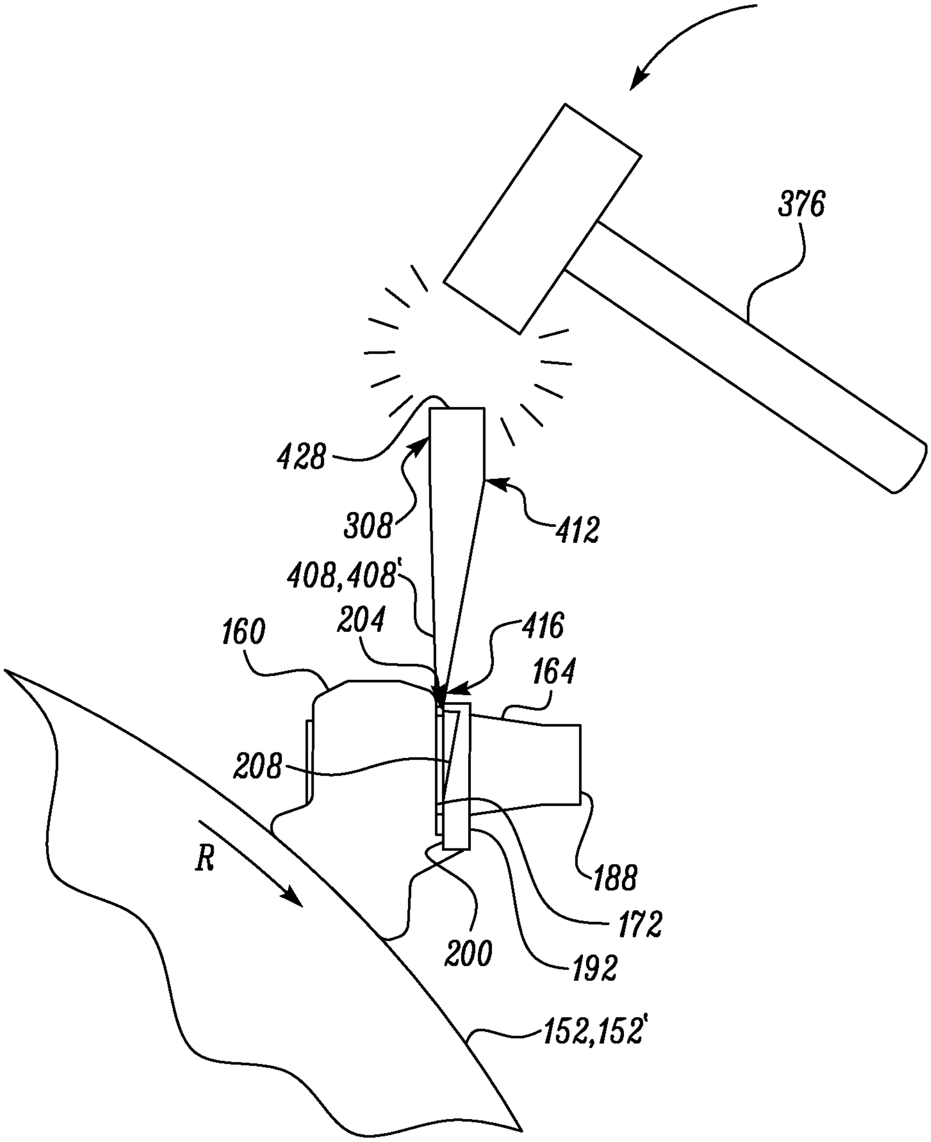

The bit holder 164 may define a recess 184 (see FIG. 4). Also, the bit holder 164 may define a bit receiving end surface 188 and the recess 184 may extend into a body of the bit holder 164 from the bit receiving end surface 188, as shown in FIG. 4. Further, the bit holder 164 may define a flange portion 192 and a shaft portion 196 (see FIG. 8). The flange portion 192 may define a flange surface 200, as shown. The shaft portion 196 may extend from the flange portion 192 (or from the flange surface 200) to extend oppositely and away from the bit receiving end surface 188, and/or in the same direction in which the recess 184 extends into the body of the bit holder 164 from the bit receiving end surface 188. The shaft portion 196 may be configured to be slidably received into the bore 176 defined by the base block 160 such that the shaft portion 196 and thus the bit holder 164 can be retained with the base block 160, e.g., during a milling operation. In some embodiments, the shaft portion 196 may include a tapered profile that may help the shaft portion 196 to be easily received and accommodated into the bore 176 of the base block 160.

It is contemplated that the shaft portion 196 of the bit holder 164 may be secured in the bore 176 of the base block 160 via an interference fit. Optionally, or additionally, the shaft portion 196 may include a hole (not shown) near an end or a terminal portion of the shaft portion 196 which may receive a lock pin (not shown) to secure the bit holder 164 in (and with) the base block 160. In an exemplary assembly of the bit holder 164 with the base block 160, as the shaft portion 196 may be received and accommodated into the bore 176 of the base block 160, the base block surface 172 of the base block 160 may be mated and/or be directed towards the flange surface 200 of the flange portion 192 of the bit holder 164—for example, see FIGS. 2, 4 through 6.

Further, an interface 204 may be defined between the base block 160 and the bit holder 164 or between the base block surface 172 and the flange surface 200. In some embodiments, the flange surface 200 defines an indented prying surface 208 which may receive a tool (e.g., a pry tool 308) (discussed later) which may be usable to remove or extract the bit holder 164 from the base block 160, e.g., during a service or a maintenance or a repair of the milling drum 148. Therefore, in some embodiments, the interface 204 may be defined, at least in part, in between the indented prying surface 208 and the base block surface 172.

The cutting bit 168 may include or correspond to any cutting tool configured to contact, engage, and/or cut into one or more of the layers of the ground surface 112 to break open the ground surface 112 during the milling operation. The cutting bit 168 may define a tip portion 212, a central portion 216, and a shank portion 220 (see FIG. 4). The central portion 216 may extend between the tip portion 212 and the shank portion 220. As shown, the tip portion 212, optionally in conjunction with the central portion 216, may include a conical shape, although various other shapes of the tip portion 212 and/or the central portion 216 may be contemplated, and which may comport with a cutting action of the cutting bit 168 during the milling operation. The central portion 216 may also define an annular surface 224 (see FIG. 4) of the cutting bit 168.

The shank portion 220 may extend away from the central portion 216, e.g., from the annular surface 224 defined by the central portion 216 of the cutting bit 168, generally oppositely to a direction in which the tip portion 212 extends away from the central portion 216. Moreover, the shank portion 220 may be configured to be received and secured into the recess 184 defined by the bit holder 164. Although not limited, the shank portion 220 of the cutting bit 168 may be secured into the recess 184 of the bit holder 164 by an interference fit and/or by any suitable securing mechanism, such as ones that may use a spring, a dowel, or any other such element, now known or in the future developed, and by way of which a securement between the cutting bit 168 and the bit holder 164 may be attained. Further, in an assembly of the cutting bit 168 with the bit holder 164, the central portion 216 may rest against the bit receiving end surface 188 such that the annular surface 224 of central portion 216 of the cutting bit 168 may be mated and/or directed towards the bit receiving end surface 188.

In some embodiments, the tip portion 212 of the cutting bit 168 may be composed of one or more of diamond, tungsten carbide, or any other appropriate material now known or in the future developed and may be secured (e.g., integrally or removably) to the central portion 216. The central portion 216 may be composed of hardened steel, tungsten carbide, or any other appropriate material now known or in the future developed.

Referring to FIGS. 3 through 8, a tooling 300 is exemplarily illustrated and described. The tooling 300 is applicable for removing the bit holder 164 from the base block 160 of the milling drum 148, and thus may be applicable to remove the bit holders of all cutting bit assemblies 156 from their respective base blocks, after cutting bit 168 having been removed from the bit holder 164. The tooling 300 may include a bracket 304, a pry tool 308, and an actuation member 312. The tooling 300 may also include other components, such as a pin 316. Details related to the tooling 300, and, more particularly, to each component of the tooling 300, shall now be described in detail.

The bracket 304 may be configured to be engaged with the bit holder 164, e.g., when removing the bit holder 164 from the base block 160 of the milling drum 148. The bracket 304 may include a rigid body and/or may be exemplarily made from any suitable high strength material, such as steel and/or any of the aforesaid materials, and/or their material variants, usable to manufacture the base block 160 and/or the bit holder 164. As an example, the bracket 304 may define a first stem 320 and a second stem 324. The first stem 320 and the second stem 324 may be located at an angular offset to each other. For example, the first stem 320 and the second stem 324 may be disposed orthogonally (e.g., at right angle) with respect to each other, and which may impart an L-shaped profile to the bracket 304. In so doing, the bracket 304 may define an elbow 328 at a bent portion defined between the first stem 320 and the second stem 324, as shown. Each of the first stem 320 and the second stem 324 of the bracket 304 may define corresponding ends, i.e., a first stem end 332 and a second stem end 336, as shown. Said first stem end 332 and second stem end 336 may be correspondingly located away and disposed remotely to the elbow 328.

Although the orthogonal configuration of the bracket 304 is described above, it is possible for the first stem 320 and the second stem 324 to be disposed with respect to each other at various other angles (e.g., an acute angle or an obtuse angle) and such angles may depend upon the nature of application of the tooling 300, specification of the cutting bit assembly 156', e.g., the type, size, and/or a profile, of the bit holder 164 and/or one or more components of the cutting bit assembly 156' (e.g., the base block 160) that may surround or be located in the vicinity of the bit holder 164). Therefore, the orthogonal configuration of the bracket 304 is to be viewed as exemplary. The bracket 304 may also include additional stems such as the first stem 320 and the second stem 324.

In one example, the first stem 320 may include a generally rectangular cross-section and may accordingly define an outside wall surface 340 and an inside wall surface 344. The outside wall surface 340 and the inside wall surface 344 may be disposed oppositely to each other and may define a thickness, FS, therebetween. Further, the first stem 320 may define sidewall surfaces 348 (e.g., two parallel sidewall surfaces 348') that may extend between the outside wall surface 340 and the inside wall surface 344. Given the bent configuration or the bent portion of the first stem 320 and the second stem 324, the inside wall surface 344 of the first stem 320 may be bent and/or directed inwards or towards the second stem 324 while the outside wall surface 340 of the first stem 320 may be bent and/or directed outwards or away from the second stem 324.

Figure 6:
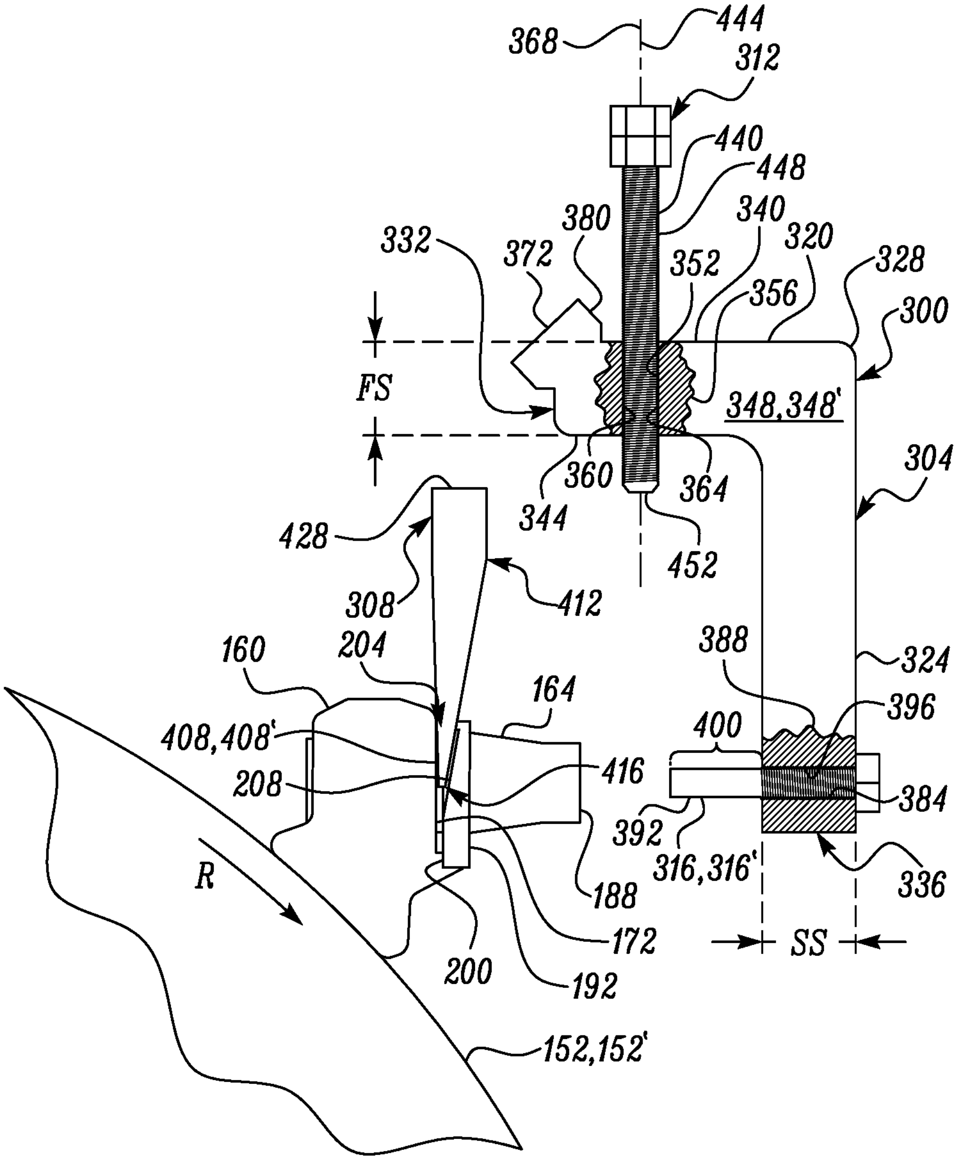

The bracket 304 may include a through hole (e.g., a first through hole 352) (see first cutout 356 provided in FIG. 6). As an example, the first through hole 352 may be defined on the first stem 320. In this regard, the first through hole 352 may pass through the thickness, FS, of the first stem 320 and may span between the outside wall surface 340 and the inside wall surface 344. Further, the first through hole 352 may be open to each of the outside wall surface 340 and the inside wall surface 344. The first through hole 352 may define an inner surface 360 extending across the thickness, FS, and also extending between the outside wall surface 340 and the inside wall surface 344. The inner surface 360 may define threads, e.g., first threads 364, which may extend throughout the thickness, FS, or from the outside wall surface 340 to the inside wall surface 344. The first through hole 352 may also define a first through hole axis 368.

Figure 7:
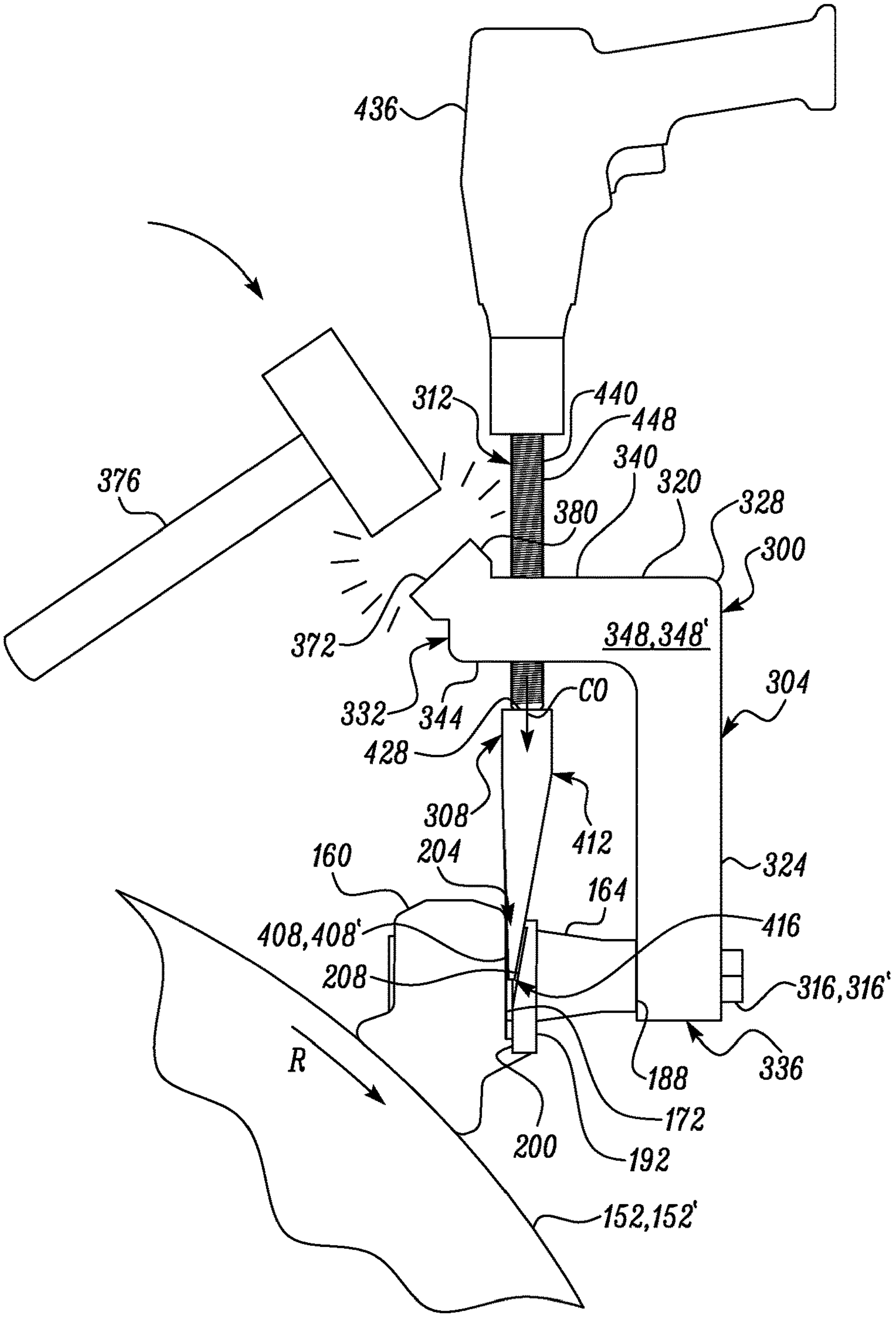
Figure 8:
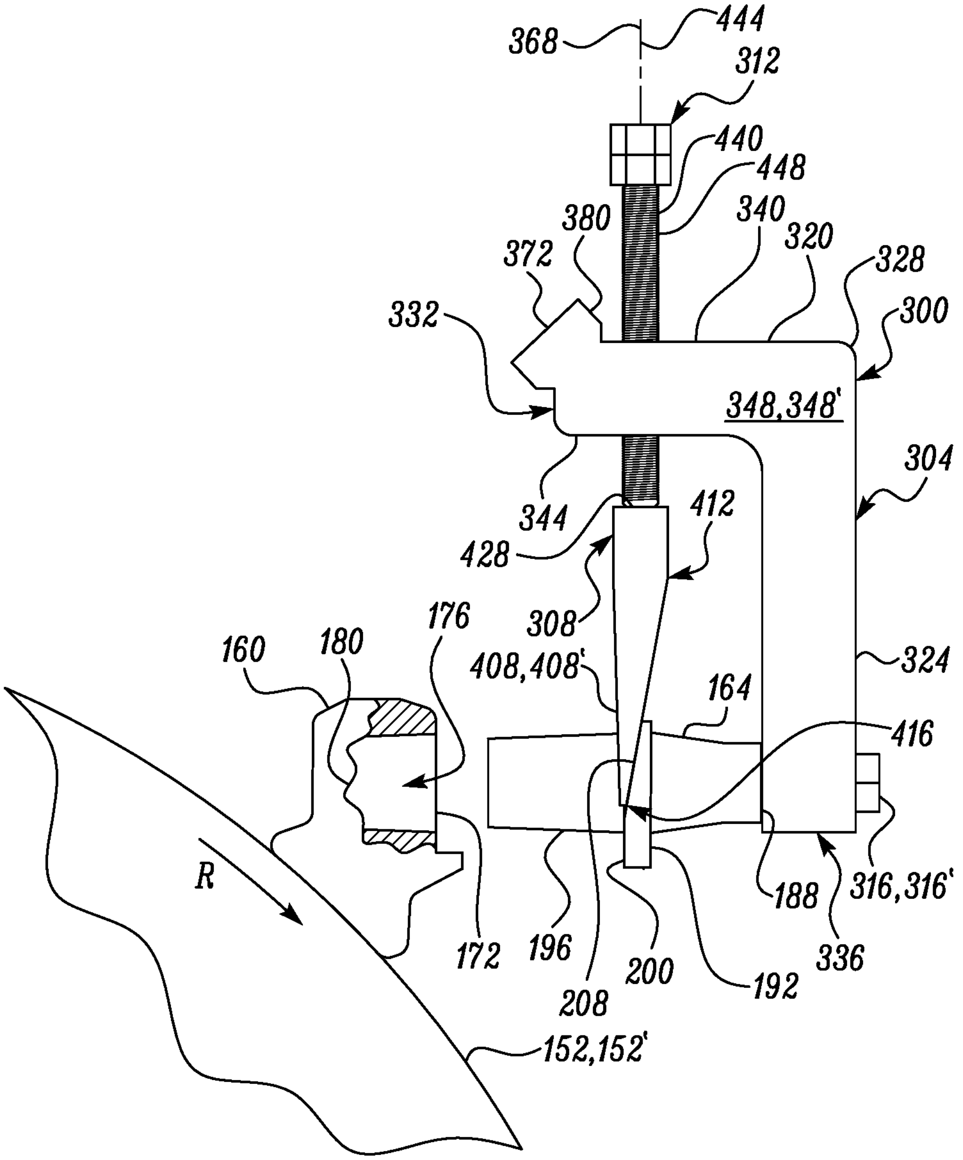

Further, the bracket 304 may define one or more impact surfaces (e.g., an impact surface 372) to receive one or more impacts, e.g., impacts from a handheld hammer 376 (see FIG. 7). In some embodiments, the impact surface 372 may be defined on the first stem 320 of the bracket 304. In this regard, the first stem 320 may define a stub portion 380 extending outwardly and away from the first stem end 332 of the first stem 320, and the impact surface 372 may be defined on the stub portion 380. Given the placement of the stub portion 380 at the first stem end 332 of the first stem 320 of the bracket 304, the impact surface 372 may also be defined or disposed at the first stem end 332 of the first stem 320 of the bracket 304. Other locations for the stub portion 380 and/or the impact surface 372 may be contemplated and thus a location of the impact surface 372 can be further optimized for usability.

Additionally, the bracket 304 can include one or more impact surfaces in excess of the impact surface 372, and the same may be provided, either alone or in combination, at various other locations on the bracket 304. Such variations may be contemplated and/or optimized by someone skilled in the art based on the description in the present disclosure. Effectively, the location and/or configuration of the impact surface 372 is exemplary. In some embodiments, the stub portion 380 (and thus the impact surface 372) may be made from the same material as the bracket 304, and thus the stub portion 380 (along with the impact surface 372) may be integrally formed with the bracket 304. Moreover, the impact surface 372 may include a flat, planar surface that may be inclined to the first through hole axis 368 defined by the first through hole 352.

Furthermore, the bracket 304 may be configured to be engaged with the bit holder 164 at the second stem 324. To this end, the pin 316 of the tooling 300 may be fixedly coupled to bracket 304 and the pin 316 (or a portion of the pin 316) (see exposed portion 400 discussed below) may be insertable into the recess 184 defined by the bit holder 164 to enable the bracket 304 (e.g., the second stem 324 of the bracket 304) to be engaged with the bit holder 164. As an example, the second stem 324 of the bracket 304 may include a second through hole 384 (see second cutout 388 provided in FIG. 6). The second through hole 384 may pass and/or extend through a thickness, SS, of the second stem 324 and the pin 316 of the tooling 300 may be passed through the second through hole 384 and may be threadably coupled to the second through hole 384 to be fixedly coupled to the second stem 324 of the bracket 304.

As an example application of the pin 316, the pin 316 may include a fastener, e.g., a threaded fastener 316', which may exemplarily include a partially threaded shank portion 392 (as shown in FIG. 6). The partially threaded shank portion 392 may be mated and coupled with threads 396 of the second through hole 384 of the second stem 324 to enable the pin 316 to be fixedly coupled with the second stem 324 of the bracket 304. When the pin 316 is fixedly coupled with the second stem 324 of the bracket 304, a portion (e.g., exposed portion 400) of the partially threaded shank portion 392 of the pin 316 may jut out from another side of the second stem 324.

The exposed portion 400 may be a non-threaded portion of the partially threaded shank portion 392 of the pin 316. The exposed portion 400 may be inserted into the recess 184 of the bit holder 164 so as to enable the bracket 304 (e.g., the second stem 324 of the bracket 304) to be engaged with the bit holder 164. In some embodiments, the pin 316 may include an O-ring (not shown) positioned therearound that may allow the pin 316 to fit relatively tightly into the recess 184 of the bit holder 164 and thus enable the second stem 324 (and the bracket 304) to be retentively engaged with the bit holder 164. Although an exemplary type of pin 316 is described above, various other pin types may be contemplated. Further, various methods of coupling the pin 316 with the second stem 324 of the bracket 304, and, also, various methods of engaging the pin 316 with the recess 184 of the bit holder 164 may be contemplated.

The pry tool 308 may define a portion (e.g., a prying portion 404, see FIGS. 3 and 4) which may be configured to be positioned between the bit holder 164 and the base block 160 so as to pry out and remove the bit holder 164 from the base block 160 during an exemplary removal process of the bit holder 164 from the base block 160. As an example structure of the prying portion 404 of the pry tool 308, the prying portion 404 may include twin legs 408 (e.g., a first leg 408' and a second leg 408') (see FIG. 3). The first leg 408' and the second leg 408' may be spaced apart from one another to define a space, S, therebetween. Although not limited, the first leg 408' and the second leg 408' may be similarly shaped and sized. To this end, each of the first leg 408' and the second leg 408" may define a profile that tapers down from a wider, first prying end 412 of the prying portion 404 to a narrower, second prying end 416 of the prying portion 404. In other words, the second prying end 416 may be narrower than the first prying end 412. The narrower, second prying end 416 allows the prying portion 404 of the pry tool 308 to be inserted and positioned in between the base block 160 and the bit holder 164 and/or between the base block surface 172 of the base block 160 and the flange surface 200 of the flange portion 192 of the bit holder 164 when the bit holder 164 is to be removed from the base block 160.

Figure 3:
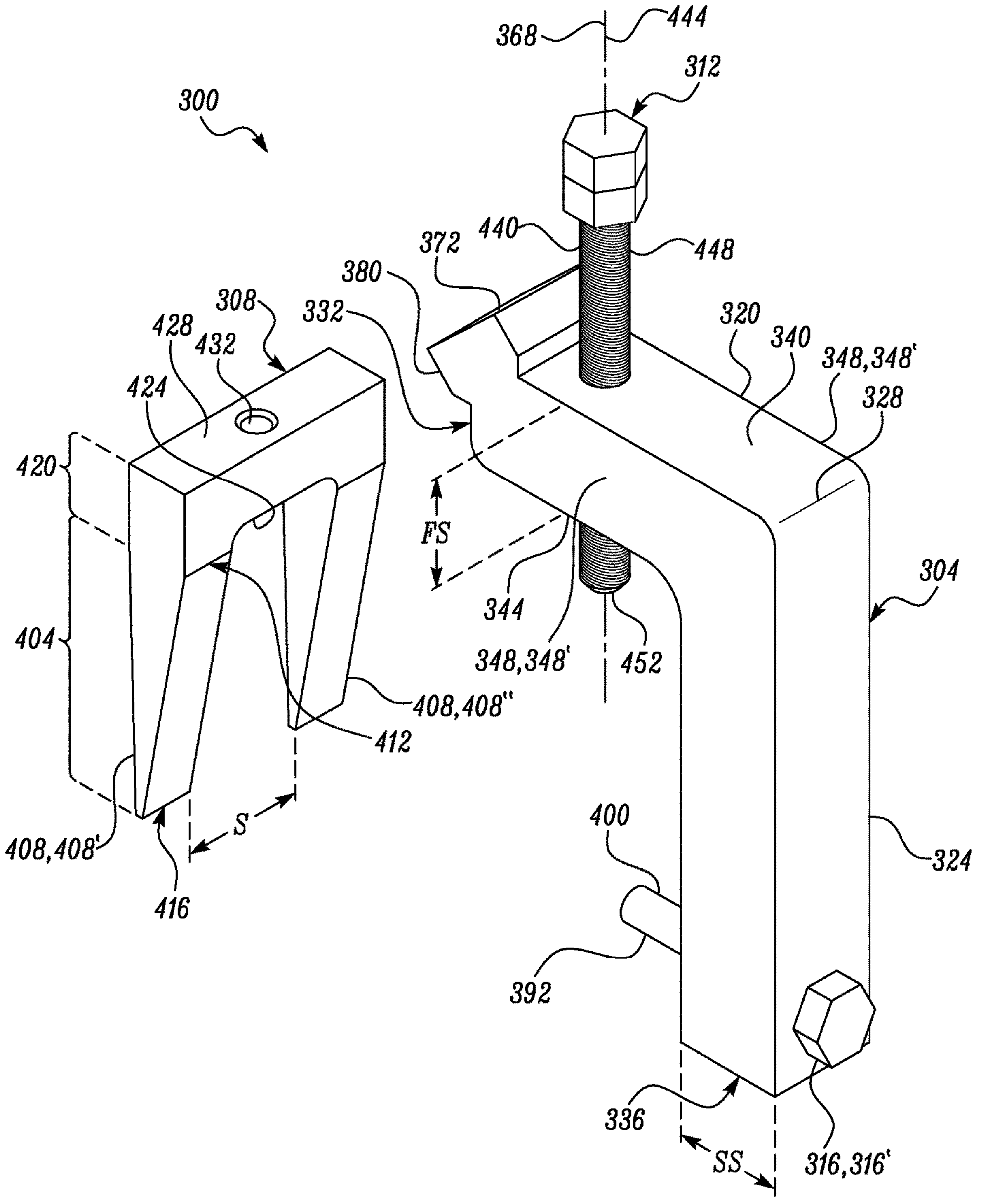
FIG. 3 is a perspective view of a tooling applicable for removing a bit holder from a base block of the milling drum, in accordance with one or more aspects of the present disclosure.

The pry tool 308 may also define a bridge portion 420 (see FIGS. 3 and 4). The bridge portion 420 may extend or span between the first leg 408' and the second leg 408", e.g., between the first prying ends 412 of each of the first leg 408' and the second leg 408' to connect (e.g., immovably and rigidly) the first leg 408' with the second leg 408". Such connection also imparts a generally inverted U-shaped profile to the pry tool 308 (see exemplary orientation of the pry tool 308 in FIG. 3). The bridge portion 420 may define an underside surface 424 and an overside surface 428. The overside surface 428 may be located opposite to the underside surface 424. More particularly, the underside surface 424 may be directed towards the space, S, defined between the first leg 408' and the second leg 408", while the overside surface 428 may be directed away from the space, S, defined between the first leg 408' and the second leg 408'".

The pry tool 308 may define a receiving portion 432 for receiving and to be in contact with the actuation member 312 during the removal process of the bit holder 164 from the base block 160. The reception and the contact of the actuation member 312 with the receiving portion 432 of the pry tool 308 allows the actuation member 312 to exert a pushing action on and against the pry tool 308 during the aforesaid removal process—details related to such a process are described later by way of an exemplary method/flowchart 900. As an example, the receiving portion 432 is defined on the bridge portion 420 of the pry tool 308. In particular, the receiving portion 432 may be defined on the overside surface 428 of the bridge portion 420. As an example, the receiving portion 432 may include a depression extending into a body of the bridge portion 420 and shaped to receive and cooperate with a tip of the actuation member 312.

The actuation member 312 may be movably engaged with the bracket 304 and may be actuatable by a using a turning tool 436 (see FIG. 7). The turning tool 436 may include a mechanized screw turning tool or a screwing gun (one or both of which may be exemplarily pneumatically or electrically operated) or may include a manually actuated tool. The turning tool 436 may be applied to actuate the actuation member 312 and enable the actuation member 312 to contact and exert a pushing action on the pry tool 308 (e.g., on the receiving portion 432 of the pry tool 308) to move and advance the prying portion 404 of the pry tool 308 into the interface 204 defined between the bit holder 164 and the base block 160. As an example, the actuation member 312 is movably engaged at (or with respect to) the first stem 320 of the bracket 304. In this regard, the actuation member 312 may include a stud 440.

The stud 440 may define a stud axis 444 and second threads 448 annularly formed on a body of the stud 440 and around the stud axis 444. The stud 440 may be passed through the first through hole 352 such that the first threads 364 of the first through hole 352 may be rotatably mated with the second threads 448 of the stud 440 and such that the stud axis 444 may fall in line and/or be co-axial with the first through hole axis 368 of the first through hole 352. The threadable engagement or mating of the first threads 364 with the second threads 448 enables the actuation member 312 to be movably engaged with the bracket 304 (or with the first stem 320 of the bracket 304). In other words, an application of torque causing a rotation of the stud 440 within the first through hole 352 and about the stud axis 444 or the first through hole axis 368 may result in a linear movement (e.g., along the stud axis 444 or the first through hole axis 368) of the actuation member 312 with respect to the first stem 320 of the bracket 304 due to cooperation of first threads 364 and second threads 448.

When removing the bit holder 164 from the base block 160 during the removal process, an end 452 of the stud 440 may contact (e.g., enter into the depression defined by) the receiving portion 432 and exert a pushing action on the pry tool 308 to move and advance the prying portion 404 of the pry tool 308 into the interface 204 defined between the bit holder 164 and the base block 160. Further, given that the impact surface 372 may be inclined to the first through hole axis 368 defined by the first through hole 352, the impact surface 372 may also be inclined at an angle to the stud axis 444, e.g., when the stud 440 is threadably engaged with the first through hole 352. In some embodiments, and for exemplary or illustrative purposes only, the angle between the impact surface 372 and the stud axis 444 may be in a range between thirty degrees and sixty degrees. Such an angle may help prevent impacts (on the impact surface 372) from interfering with the stud 440 and/or with the actuation member 312.

INDUSTRIAL APPLICABILITY

Figure 9:
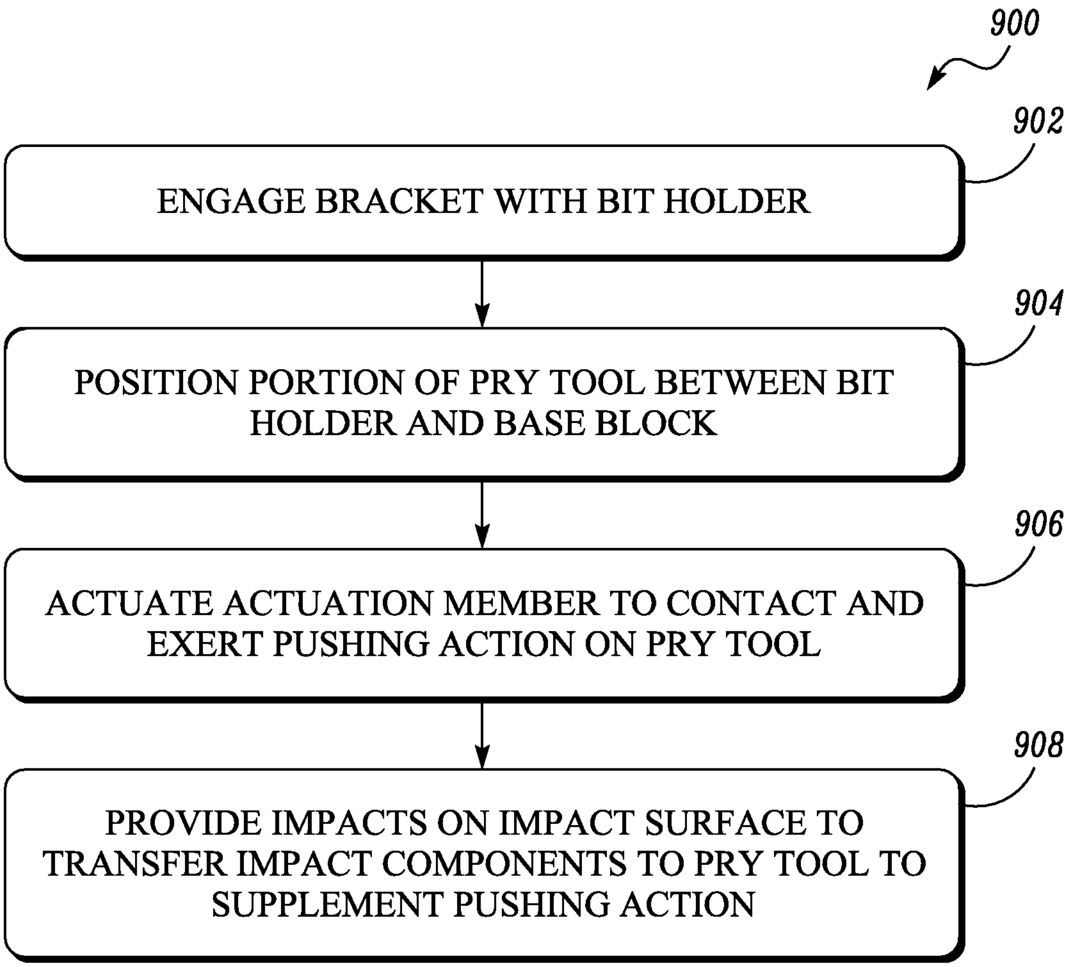
FIG. 9 is a flowchart indicating various stages in the exemplary process or method illustrated in FIGS. 4 to 8, in accordance with one or more aspects of the present disclosure.

As the shaft portion 196 of the bit holder 164 may be secured in the bore 176 of the base block 160 via an interference fit, a commensurate effort is generally needed to disengage and remove the bit holder 164 from the base block 160 of the milling drum 148. Additionally, during the milling operation, as the cutting bit assembly 156' may contact and engage the ground surface 112 to break and split open one or more layers of the ground surface 112, forces (e.g., reactionary forces) may be generated against the cutting bit assembly 156'. Such forces may act upon the cutting bit assembly 156', potentially making the bit holder 164 (or the shaft portion 196) and the base block 160 (or the recess 184) fit even more tightly with each other. The forthcoming description discusses an exemplary method and/or a process (i.e., the removal process) for removing the bit holder 164 from the base block 160 by use of the tooling 300 described above. The method or process is explained by way of the flowchart 900 which is illustrated in FIG. 9. The exemplary method or process has also been discussed with reference to FIGS. 2 to 8 and begins at stage 902 and ends at stage 908.

At stage 902, an operator engages the bracket 304 with the bit holder 164. For this purpose, the operator may introduce the pin 316 into the second through hole 384 and may threadably couple the pin 316 into the second through hole 384 such that the exposed portion 400 juts out from one of the sides of the second stem 324. The operator may then insert the exposed portion 400 of the pin 316 (fixedly or threadably coupled to the bracket 304) into the recess 184 of the bit holder 164. In that manner, an engagement of the pin 316 and thus the second stem 324 of the bracket 304 with the bit holder 164 is effectively attained. The method proceeds to stage 904.

At stage 904, the operator may access the pry tool 308 and insert the narrower, second prying ends 416 of the first leg 408' and the second leg 408' (e.g., by using the handheld hammer 376) into the interface 204 defined between the bit holder 164 and the base block 160. According to an example, the narrower, second prying ends 416 of the first leg 408' and the second leg 408' of the pry tool 308 may ingress into a gap, G, (see FIGS. 2 and 4) defined between the base block surface 172 of the base block 160 and the flange surface 200 of the flange portion 192 of the bit holder 164 to position the prying portion 404 of the pry tool 308 in between the bit holder 164 and the base block 160. Moreover, the first leg 408' and/or the second leg 408" may also contact the indented prying surface 208. According to an example, when the prying portion 404 of the pry tool 308 is positioned in between the bit holder 164 and the base block 160, the inverted U-shaped profile of the pry tool 308 may sit around the interface 204 to at least partially surround the interface 204 defined between bit holder 164 and the base block 160. The method proceeds to stage 906.

At stage 906, the operator may access the turning tool 436 to actuate (which may involve a screwing action or a rotary action or an application of torque) the actuation member 312 or the stud 440 into the first through hole 352 such that the actuation member 312 or the stud 440 may start to move (e.g., linearly move) in a direction (see direction or arrow, CO, FIG. 7) defined from the outside wall surface 340 towards the inside wall surface 344, along the stud axis 444 or the first through hole axis 368. The actuation may continue until the actuation member 312 or the end 452 of the stud 440 may contact or be received into the receiving portion 432 and may continue further in order to exert a pushing action on the receiving portion 432 and thus the pry tool 308 to move and advance the prying portion 404 of the pry tool 308 into the interface 204 defined between the bit holder 164 and the base block 160. The advancement or ingression of the pry tool 308 into the interface 204 helps in increasing the gap, G, in turn assisting with disengaging and prying out the bit holder 164 from the base block 160. The method proceeds to stage 908.

At stage 908, the operator (or another operator) may access the handheld hammer 376 (which can be much smaller or compact in comparison to a conventionally large sledge hammer used in convention removal procedures) and may provide one or more impacts (e.g., repeatedly) on the impact surface 372 of the bracket 304 such that when the impact surface 372 receives the impacts, one or more impact components (see arrow, CO, in FIG. 7, which may also represent an impact component) may be correspondingly transferred to the pry tool 308 to supplement the pushing action for a removal of the bit holder 164 from the base block 160. It may be noted that the impact components may be transferred to the pry tool 308 through the actuation member 312 or the stud 440. The impacts on the impact surface 372 and/or the actuation of the actuation member 312 may continue until the gap, G, defined between the base block surface 172 of the base block 160 becomes wide enough for the bit holder 164 to be disengaged and removed from the base block 160. Optionally, the operator may continue to use the turning tool 436 to continue to urge the actuation member 312 or the stud 440 into the first through hole 352 in order to continue exerting the pushing action on the receiving portion 432, which, together with the impacts provide by the handheld hammer 376, will help dislodge the bit holder 164 from the base block 160. The method ends at stage 908.

The combination of the pushing action imparted by the actuation of the actuation member 312 and the impacts provided on the impact surface 372, facilitates the removal of the bit holder 164 from the base block 160 in comparison to a method that may rely solely on the use of large, bulky, and difficult to handle, sledge hammers to remove the bit holder 164 from the base block 160. The tooling 300 accordingly mitigates labor and an overall effort to remove the bit holder 164 from the base block 160, thus enhancing operator comfort and convenience. The aforementioned method or process may be performed on all cutting bit assemblies 156, and thus bit holders of all cutting bit assemblies 156 may be removed from their respective base blocks by use of the tooling 300.

The term "coupled" as employed herein is used broadly and encompasses both direct and indirect connections between two components—direct meaning at least portions of the two components are in contact with one another, possibly with the use of fasteners or fastening material, and indirect meaning at least portions of the two components are in contact with at least portions of at least one intermediate structure therebetween, possibly with the use of fasteners or fastening material.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A method for removing a bit holder from a base block of a milling drum, the method comprising:
- engaging a bracket with the bit holder, the bracket defining an impact surface;
- positioning a portion of a pry tool between the bit holder and the base block;
- actuating an actuation member movably engaged with the bracket to contact and exert a pushing action on the pry tool to move and advance the portion of the pry tool into an interface defined between the bit holder and the base block; and
- providing one or more impacts on the impact surface such that when the impact surface receives the one or more impacts, one or more impact components are correspondingly transferred to the pry tool to supplement the pushing action for a removal of the bit holder from the base block.

2. The method of claim 1, wherein engaging the bracket with the bit holder includes:
- inserting a pin fixedly coupled to the bracket into a recess defined by the bit holder to enable the bracket to be engaged with the bit holder.

3. The method of claim 1, wherein the bracket includes a through hole defining an inner surface having first threads, the actuation member including a stud having second threads, the stud passes through the through hole such that the first threads are rotatably mated with the second threads to enable the actuation member to be movably engaged with the bracket.

4. The method of claim 3, wherein the stud defines a stud axis and the impact surface is inclined at an angle to the stud axis.

5. The method of claim 4, wherein the angle is in a range between thirty degrees and sixty degrees.

6. The method of claim 1, wherein
- the bracket defines a first stem and a second stem, the first stem and the second stem being located at an angular offset to each other, and
- the actuation member is movably engaged with the bracket at the first stem and the bracket is configured to be engaged with the bit holder at the second stem.

7. The method of claim 6, wherein the first stem and the second stem are disposed orthogonally with respect to each other imparting an L-shaped profile to the bracket.

8. The method of claim 6, wherein the impact surface is defined on the first stem.

9. The method of claim 6, wherein the bracket defines an elbow between the first stem and the second stem, the first stem defining a stem end located away and remotely to the elbow and the impact surface being disposed at the stem end.

10. The method of claim 1, wherein the pry tool defines a receiving portion to receive and be in contact with the actuation member and for the pushing action to be exerted thereon, and the one or more impact components are transferred to the pry tool through the actuation member.

* * * * *